United States Patent
Correll

(10) Patent No.: US 10,277,553 B2
(45) Date of Patent: Apr. 30, 2019

(54) METHOD FOR GENERATING ADDRESSES IN A COMPUTER NETWORK

(75) Inventor: Christian Correll, Munich (DE)

(73) Assignee: Unify GmbH & Co. KG, Munich (DE)

( * ) Notice: Subject to any disclaimer, the term of this patent is extended or adjusted under 35 U.S.C. 154(b) by 1185 days.

(21) Appl. No.: 13/979,676

(22) PCT Filed: Apr. 15, 2011

(86) PCT No.: PCT/EP2011/001933
§ 371 (c)(1),
(2), (4) Date: Oct. 28, 2013

(87) PCT Pub. No.: WO2012/139602
PCT Pub. Date: Oct. 18, 2012

(65) Prior Publication Data
US 2014/0047128 A1    Feb. 13, 2014

(51) Int. Cl.
H04L 29/12    (2006.01)

(52) U.S. Cl.
CPC .......... *H04L 61/20* (2013.01); *H04L 29/1232* (2013.01); *H04L 29/12801* (2013.01); *H04L 29/12839* (2013.01); *H04L 29/12915* (2013.01); *H04L 29/12952* (2013.01); *H04L 61/2092* (2013.01); *H04L 61/6004* (2013.01); *H04L 61/6022* (2013.01); *H04L 61/6059* (2013.01); *H04L 61/6077* (2013.01); *H04L 29/12254* (2013.01); *H04L 61/2038* (2013.01)

(58) Field of Classification Search
CPC .............. H04L 61/20; H04L 29/12; H04J 3/24
USPC ........ 709/245; 370/475, 338, 389, 410, 465, 370/393, 401, 400, 392, 354; 455/561
See application file for complete search history.

(56) References Cited

U.S. PATENT DOCUMENTS

| 7,047,453 B2* | 5/2006 | Lappin, Jr. ............. | H04L 69/22 370/392 |
| 7,281,187 B2* | 10/2007 | Yonge, III ............. | H04L 29/06 370/469 |

(Continued)

FOREIGN PATENT DOCUMENTS

| CN | 101001261 A | 7/2007 |
| TW | 200501667 A | 4/1994 |

OTHER PUBLICATIONS

Internet Engineering Task Force (IETF) Request for Comments: 4862 IPv6 Stateless Address Autoconfiguration Thomas et al. (Sep. 2007).*
Internet Engineering Task Force (IETF) Request for Comments: 4862 IPv6 Stateless Address Autoconfiguration Thomson et al. (Sep. 2007).*

(Continued)

*Primary Examiner* — Philip J Chea
*Assistant Examiner* — Hassan A Khan
(74) *Attorney, Agent, or Firm* — Buchanan Ingersoll & Rooney PC

(57) ABSTRACT

A method for creating a plurality of addresses for a network element of a communication network can include the steps of creating a virtual identifier for each address to be created from an existing identifier of said network element and from at least one configured piece of additional information; creating an address from at least one created virtual identifier; checking the virtual identifiers created in such a way or the addresses created from said virtual identifiers for the presence of a collision; and discarding colliding virtual identifiers or the addresses created from said virtual identifiers.

20 Claims, 1 Drawing Sheet

(56) References Cited

U.S. PATENT DOCUMENTS

| | | | | |
|---|---|---|---|---|
| 7,974,311 | B2* | 7/2011 | Vesterinen | H04L 29/12216 370/338 |
| 8,161,185 | B2* | 4/2012 | Wells | H04L 12/00 370/389 |
| 8,565,239 | B2* | 10/2013 | Matthews | H04L 45/24 370/351 |
| 2002/0133607 | A1* | 9/2002 | Nikander | H04L 63/0442 709/229 |
| 2004/0002877 | A1* | 1/2004 | Angelo | G06Q 30/012 705/302 |
| 2004/0148412 | A1* | 7/2004 | Itoh | H04L 29/12264 709/229 |
| 2004/0210649 | A1* | 10/2004 | Bhogal | H04L 29/12783 709/222 |
| 2005/0114749 | A1* | 5/2005 | Yonge, III | H04L 29/06 714/752 |
| 2006/0104243 | A1* | 5/2006 | Park | H04L 63/0442 370/331 |
| 2007/0091822 | A1* | 4/2007 | Do | H04L 29/12216 370/254 |
| 2010/0211775 | A1* | 8/2010 | Vogt | H04L 29/12801 713/163 |
| 2014/0123140 | A1* | 5/2014 | Motoki | H04L 41/0806 718/1 |

OTHER PUBLICATIONS

Internet Engineering Task Force (IETF) Request for Comments: 4941 Privacy Extensions for Stateless Address Autoconfiguration in IPv6 Narten et al. (Sep. 2007).*

Internet Engineering Task Force (IETF) Request for Comments: 4862 IPv6 Stateless Address Autoconfiguration Thomson et al. (September) (Year: 2007).*

Internet Engineering Task Force (IETF) Request for Comments: 4941 Privacy Extensions for Stateless Address Autoconfiguration in IPv6 Narten et al. (September) (Year: 2007).*

International Preliminary Report on Patentability and Written Opinion for PCT/EP2011/001933 dated Oct. 24, 2013 (Form PCT/IB/373 and PCT/ISA/237 (German Translation).

International Preliminary Report on Patentability and Written Opinion for PCT/EP2011/001933 dated Oct. 24, 2013 (Form PCT/IB/373 and PCT/ISA/237 (English Translation).

International Search Report and Written Opinion for PCT/EP2011/001933 dated Mar. 9, 2012 (German Copy).

Eastlake, D. et al., Randomness Requirements for Security, Standard Tracks, 2005, 1-48.

Hinden, R. et al., IPVersion 6 Addressing Architecture, Standard Tracks, 2006, 1-25.

Narten, T. et al., Privacy Extensions for Stateless Address Auto Configuration in IPV6, Standard Tracks, 2007, 1-23.

* cited by examiner

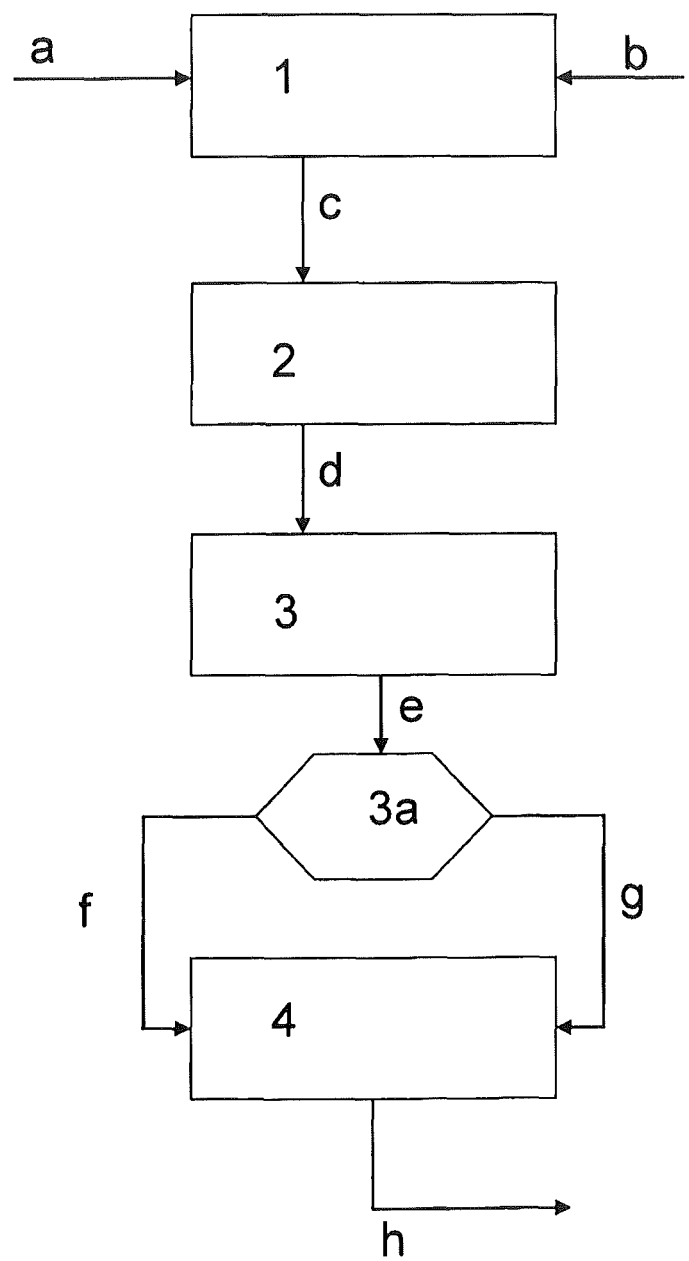

METHOD FOR GENERATING ADDRESSES IN A COMPUTER NETWORK

CROSS-REFERENCE TO RELATED APPLICATIONS

This application is the United States national phase under 35 U.S.C. § 371 of PCT International Patent Application No. PCT/EP2011/001933, filed on Apr. 15, 2011.

BACKGROUND OF THE INVENTION

Field of the Invention

Embodiments relate to methods for creating multiple addresses for one network element in a communication network.

An important example of a known method for creating addresses is auto-configuration (i.e., self-assignment) of the (specific) internet protocol (IP) address for a network element within the StateLess Address Auto Configuration (SLAAC) process, as specified in Request for Comments (RFC) 4862 for IPv6 addresses. This method relieves the network administrator from having to manually manage IP addresses. It is based on generating a link-local IP address from a piece of information created for that purpose (the "interface identifier"), which uniquely identifies the network interface of a network element. The Media Access Control (MAC) address of a local area network (LAN) card is a good example of an interface identifier (RFC 2464). However, the method used to date generates only one link-local IP address from the MAC address.

Because of more recent technical developments, many virtual- or pseudo-network interfaces now require an IP address from the same IP sub-network, but in some cases only one physical network interface with an interface identifier, such as a LAN card with its MAC address, is available. Examples of this are virtual network interfaces and virtual modules or multiple virtualized machines on one host.

In such cases, auto-configuration using SLAAC can generate only one IP address per network interface, because current network interfaces generally have only one interface identifier. In these cases, if multiple IP addresses are needed, all of the related IP addresses must be added manually. Another known solution to this problem is using multiple interface identifiers in relation to one network interface, such as having each network interface of a virtual machine be assigned its own MAC address. A specific MAC address band (00-50-56-xx-xx-xx) has already been officially registered for this purpose.

BRIEF SUMMARY OF THE INVENTION

According to embodiments of the invention, a method for creating multiple addresses for one network element in a communication network involves the following steps:

a) creating a virtual identifier for each address to be created from an existing identifier for this network element and at least one configured piece of additional information;

b) creating an address from at least one created virtual identifier;

c) checking the virtual identifiers created as stated above or the addresses created from those virtual identifiers for the presence of a collision;

d) discarding any colliding virtual identifiers or addresses created from those virtual identifiers.

BRIEF DESCRIPTION OF THE FIGURES

FIG. 1 shows a schematic flow diagram of the method according to the invention using an exemplary embodiment.

As previously noted, we provide according to embodiments of the invention, a method for creating multiple addresses for one network element in a communication network involves the following steps:

a) creating a virtual identifier for each address to be created from an existing identifier for this network element and at least one configured piece of additional information;

b) creating an address from at least one created virtual identifier;

c) checking the virtual identifiers created as stated above or the addresses created from those virtual identifiers for the presence of a collision; and d) discarding any colliding virtual identifiers or addresses created from those virtual identifiers.

DETAILED DESCRIPTION OF THE INVENTION

In this regard, a communication network is understood to be a collection of multiple technical, primarily standalone electronic systems (especially computers or other communication devices, also in particular wireless components, etc.), wherein the individual systems are capable of communicating with each other. Examples of communication networks are data networks, computer networks, telephone networks, and the Internet.

In this regard, a network element of a communication network is understood to be a device in such a communication network that is capable of or is actually participating in communication. Network elements are also called network components. They preferably have at least one network interface that gives them access to the communication network. Important examples of network elements include communication terminals, and also switches, routers, and similar devices capable of communication in such communication networks.

In this regard, an address for a network element of a communication network is understood to mean a piece of information that is used to transport data or messages from a sender to the designated recipient. Important examples of addresses are IP addresses. Similar to a mailing address on a letter, data packets have an IP address that preferably uniquely identifies the recipient. Based on this address, "post offices" in the communication network, such as routers, can determine in which direction the packet should be sent onward. Unlike postal addresses, IP addresses are not linked to a specific physical location. In order to establish communication between two technical devices, each device must be able to send data to the other device. In order for these data to be received by the correct destination device, it must be uniquely designated (addressed). This is done in IP networks by using an IP address. For example, a web server is contacted by a web browser directly using its IP address. To do this, for a domain name the browser requests the IP address from a name server and then contacts the web server directly using its IP address "198.51.100.42."

An IP address is an address in computer networks which—like the Internet, for example—are based on the Internet Protocol (IP). It is assigned to devices that are connected to the network, which makes the devices addressable and therefore reachable. The IP address can designate a single recipient or a group of recipients (multicast, broadcast). Inversely, multiple IP addresses can be assigned to one computer. The best known notation for the IPv4 addresses in use today consists of four numbers that can have values from 0 to 255 and are separated by a period, such as 127.0.0.1. The address is described technically as being a 32-digit (IPv4) or 128-digit (IPv6) binary number.

In this regard, an identifier is understood to be a piece of information that makes a network element or network interface identifiable, preferably uniquely. Examples of such identifiers are the interface identifiers used on the Internet. Other examples are so-called MAC addresses. IPv6 addresses are 128 bits long (IPv4: 32 bits). Except in special cases, the last 64 bits indicate an interface identifier that is unique to the network interface.

A network interface can be reachable via multiple IP addresses; it is generally reached through its link-local address and a globally unique address. The same interface identifier can be part of multiple IPv6 addresses that are linked to the same network card with different prefixes. This also applies particularly to prefixes for different providers; it simplifies multi-homing processes. For example, if a network device has the IPv6 address 2001:0db8:85a3:08d3:1319:8a2e:0370:7347/64, the prefix is 2001:0db8:85a3:08d3::/64 and the interface identifier is 1319:8a2e:0370:7347.

Because generating interface identifiers from globally unique MAC addresses makes it possible to track users, Privacy Extensions (RFC 4941) were developed to eliminate this permanent connection of the user's identity to IPv6 addresses. By having the interface identifier be randomly generated and periodically changed, part of the anonymity from IPv4 should be restored.

However, in the private sector, the interface identifier and even the prefix alone in the IPv6 Address can easily allow a user to be identified, so for reasons of data protection and in connection with the Privacy Extensions, a dynamic (e.g., changed daily) prefix assigned by the provider is desirable. As described above, it is in principle possible to use IPv6 addresses from both dynamic and fixed assigned prefixes in parallel on the same network card.

In this regard, an available identifier is understood to be an identifier of a network element which was already assigned or allocated to that network element before the application of the invented method. Important examples of such available identifiers are MAC addresses, especially those assigned to network interfaces (such as LAN cards) by network elements (such as computers), preferably according to RFC 2464.

The MAC address is the hardware address for each individual network adapter that is used to uniquely identify the device in a computer network. Apple also calls it an Ethernet ID, Airport ID, or Wi-Fi address; Microsoft calls it a physical address.

The MAC address is assigned to the security layer (layer 2) of the OSI model. In the OSI model expanded by the Institute of Electrical and Electronics Engineers (IEEE), it is assigned to the Media Access Control sub-layer (layer 2a). In order to link the security layer to the network layer, the Address Resolution Protocol, for example, is used on the Ethernet with IPv4. In IPv6 there is a new protocol, Neighbor Discovery Protocol (NDP) that performs this function.

Network devices therefore need a MAC address if they are to be specifically addressed on layer 2 in order to offer services on higher layers. If the device merely sends the network packets onward, as with a repeater or hub, it is not visible on the security layer and therefore does not need a MAC address. Bridges and switches do examine the packets on the security layer in order to physically divide the network into multiple collision domains, but they themselves do not play an active role in communication, so they do not need MAC addresses for these basic functions.

However, a switch does require a MAC address if it is controlled via the computer network or offers monitoring services (via Telnet, Simple Network Management Protocol (SNMP), or Hypertext Transfer Protocol (HTTP), for example). A MAC address is also required if bridges or switches use the Spanning Tree Algorithm to prevent loops in redundantly configured computer networks. For Ethernet networks, the MAC address consists of 48 bits (six bytes). Addresses are generally written as hexadecimals.

It is usually written in bytes, with the individual bytes separated by dashes or colons, e.g., 08-00-20-ae-fd-7e or 08:00:20:ae:fd:7e. More rarely seen are configurations such as 080020aefd7e or 0800.20ae.fd7e. Of course, the sequence of the numbers is not the same in all applications. We differentiate here between the canonical and "bit-reversed" notations. The canonical form is used in most notations.

The most common notation for MAC addresses, as they appear when issuing ipconfig/ifconfig, for example, is also called "canonical form," "LSB format," or "Ethernet format." It indicates the sequence used to transmit addresses in IEEE 802.3 (Ethernet) and IEEE 802.4 (Token Bus). Here the transfer starts with the least significant bit (LSB) of a byte (except in a Frame Check Sequence—FCS).

IEEE 802.5 (Token Ring) and IEEE 802.6 start the transfer with the most significant bit (MSB). This can easily lead to misunderstandings if there is no indication of whether it is stated in canonical notation with normal byte notation or in bit-inversed transfer notation. An address whose canonical form is 12-34-56-78-9A-BC, for example, using the standard transmission form (LSB first, i.e., read from right to left) would be transmitted over the wire in the bit sequence 01001000 00101100 01101010 00011110 01011001 00111101.

In Token Ring networks (MSB first, i.e., read from left to right, in normal reading direction) transmission would use the bit sequence 00010010 00110100 01010110 01111000 10011010 10111100. If the bit sequences are not consistently converted into canonical notation, the latter representation could be misinterpreted as 48-2C-6A-1E-59-3D (LSB first). The notation used in Token Ring networks is called "Bit-reversed order," "Non-canonical form," "MSB format," "IBM format," or "Token Ring format" as stated in RFC 2469.

In this regard, an additional piece of configured information is understood to be a preferably local piece of configured information, stored by a network element, especially for the purpose of generating multiple addresses for that network element. When stored locally by a network element, the additional piece of configured information is also called local additional information. This additional information is preferably used exclusively for generating identifiers that can be distinguished within a host, such as interface identifiers, for example. In such cases it is sufficient for the pieces of additional information to be unique within a host (i.e., "host-internal").

Generation of multiple addresses for a network element according to the invention is preferably supported by a fundamental principle that also supports the IPv6 address auto-configuration: An IP address includes, as an important component, a globally unique interface identifier that is preferably generated from the globally unique MAC address for the network interface of a network element, such as a LAN card. The preferred starting point for this process is an existing identifier, such as the "ordinary" interface identifier as specified in RFC 2464.

In this regard, a collision of virtual identifiers, or of addresses generated from those virtual identifiers, is understood to be the undesired occurrence of undistinguishable virtual identifiers, or addresses generated from those virtual identifiers, in at least one area of a communication network, where being able to distinguish between these virtual identifiers, or the addresses generated from them, is necessary or at least desired.

According to one preferred embodiment of the invention, which has features that can also be combined with features of other embodiments, a method is provided by which a link-local address is generated from a virtual identifier, in which a link-local prefix is added to that virtual identifier.

In this regard, a link-local address is understood to be an address with a defined validity range. Link-local ("Unicast") addresses have primarily been used since the introduction of IPv6. Link-local addresses are contained in the first bits of the IPv6 address, the prefix, and have a special function: they are not forwarded by routers and can be reached only in the same network segment. IPv6 works with "scopes," which are network topology ranges for which the address is valid. Scopes are either globally unique or link-locally unique: link-local addresses are thus only unique and valid for the physical link to which the particular network node is attached. A link-local address is used exclusively on the local network link. Link-local addresses are preferably valid only within the company's network and cannot be recognized outside of it.

A network interface can be reachable via multiple IP addresses; it is generally reachable through its link-local address and a globally unique address. The same interface identifier can be part of multiple IPv6 addresses that are linked to the same network card with different prefixes. This also applies particularly to prefixes for different providers; it simplifies the so-called "multi-homing processes."

In this regard, a link-local prefix is understood to be a prefix that is a component of an identifier or symbol sequence and contains such a component of an identifier as a partial sequence that is valid only within one network segment. Link-local addresses should not be forward by routers and are therefore reachable only in the same network segment. If a device communicates using one of these link-local addresses, the network interface used in that process must be indicated with it, because there can be multiple link-local prefixes on one device for contacting different network segments in the same address space.

According to one preferred embodiment of the invention, which has features that can also be combined with features of other embodiments, a method is provided by which a global address is generated from a link-local address by replacing the link-local prefix with a global prefix.

In this regard, a global address is understood to be an address that is valid in the same communication network. In IPv6, multiple addresses are usually linked to one network interface, so as to be able to operate a link-local address along with a global address and dynamically assigned prefixes along with fixed prefixes, for example, or to have IPv6 addresses for multiple internet providers available on the same host. In this regard, a global prefix is understood to be a prefix that is valid in the entire communication network.

An additional preferred embodiment of the invention, whose features can also be combined with features of other embodiments, proposes a method wherein the communication network is a network in which messages are transmitted in packets (preferably using a protocol used between network elements on the Internet), the addresses are IPv6 addresses, and the existing identifiers for the network elements are the MAC addresses for the network interfaces of those network elements.

A network interface is an interface that gives a computer, a network element, or a network component access to a computer network. This is also commonly called a port or a network connection. Today they are often integrated on personal computer (PC) motherboards. The typical network interface for PCs is one of the Ethernet standard variations. These offer a network connection, usually in the form of an RJ-45 socket, to which a twisted-pair cable is connected. Older network cards also still have a Bayonet Neill-Concelman (BNC) connector. Fiber-optic cable connections are also possible. The network connection for a modem or Integrated Services Digital Network (ISDN) card is also a network interface. Wireless network interfaces to a wireless local area network (WLAN) are also now widely used.

An end device generally gains access to a network via a single network interface. However, other components in a network need multiple network interfaces. A bridge has at least two network interfaces, because multiple network segments are connected to each other through it. Routers, hubs, and switches also have multiple network interfaces.

According to one preferred embodiment of the invention, which has features that can also be combined with features of other embodiments, a method is provided for generating a virtual identifier from a MAC address for a network element whose middle portion is replaced, using a hash function, by the representation of a piece of additional information stored locally in the network element.

In this regard, a hash function is understood to be almost any representation which, based on the input of an often very large source volume, generates an output of a typically smaller target volume, the so-called hash code or hash value. The name "hash function" comes from the English verb "hash" meaning hack or chop. In German it is also known as a scatter function. Both names indicate that these functions are normally used to "scatter" or "chop" data (see also "chopper" in wireless technology). Specifically in computer technology we also use the term "hash algorithm," because hash functions are often specified in the form of an algorithm rather than a mathematical function. The term hashing is used in data storage for processes that incorporate a hash function for organizing data.

Hash codes or values are generally scaled values from a limited partial range of natural numbers. A "good" hash function thus delivers values for the (expected) data such that two different inputs also result in two different outputs (otherwise a collision is said to occur). A hash value is also sometimes called a fingerprint, because it usually uniquely designates a larger data volume, the way a fingerprint usually identifies a person uniquely. Hash codes are used in cryptology, for example, to identify the content of a document without having to transmit or compare the entire content. Hash codes are used in data storage to quickly find the storage location of the requested data without requiring long searches. Hash values are also used to detect transmission errors in checksums.

Hash functions differ in the definition volumes of their inputs, the target volumes of the possible outputs, and the influence of examples and similarities between various inputs on the output (and also on any collisions that may occur). Hash functions are primarily used in hash tables, cryptology, and data processing. Hash algorithms are optimized to prevent collisions. A collision occurs when the same hash value is assigned to two different data structures. Because the hash value in practice is usually shorter than the original data structure, such collisions are unavoidable in principle, so there must be ways to detect collisions. A good hash function generates few collisions from the inputs for which it was designed. In cryptology it is also desirable that it not be possible by practical measures to generate collisions artificially (collision security). In special cases it is even possible to create a perfect (i.e., collision-proof) hash function.

The picture of an additional piece of information locally stored in the network element using a hash function is the value that the hash function generates, if the additional piece of information locally stored in the network element is used as the input value for the hash function.

According to one preferred embodiment of the invention, which has features that can also be combined with features of other embodiments, a method is provided by which at least one virtual identifier receives a designation (preferably an inverted universal/local bit) by means of which it can be distinguished from a standard identifier of a network element that was not generated according to a method as in one of the preceding claims.

According to another preferred embodiment of the invention, which has features that can also be combined with features of other embodiments, a method is provided whereby some or all of the addresses from some or all of the generated virtual identifiers are not generated until after at least one additional step in the process occurs, i.e., not immediately after the virtual identifiers are generated.

According to another preferred embodiment of the invention, which has features that can also be combined with features of other embodiments, a method is provided in which the additional information exists in the form of a table whose inputs are stored as different values for names of virtual identifiers, and each name is preferably a function of the table index.

In this regard, a table is understood to be a collection of data wherein a table value or table input is assigned or can be assigned to each value included in a table index. The table index thus designates the individual inputs of a table. A table index function is a function value that is assigned to a certain value of a table index under a given function.

According to another preferred embodiment of the invention, which has features that can also be combined with features of other embodiments, a method is provided in which the piece of additional information is used as input data for a checksum algorithm in order to generate virtual identifiers.

In computer technology, a checksum is a simple way to guarantee data integrity for transmission or storage. It is used primarily for data security and transmission.

In simple checksum algorithms, bits, bytes, or another basic data component in a message are multiplied by a certain factor and then added up in sequence. The resulting value is then stored or transmitted as the checksum. The receiver of the message can also calculate a checksum from the data and compare it to the checksum transmitted by the sender. If the two checksums are different, a transmission error has occurred and the message must be repeated. If the two checksums are identical, it is highly likely that the message has been correctly transmitted.

A simple example of a checksum is the sum of the digits in a number. However, using this method, an occurrence such as transposed numbers, which is a very common error when people enter numerical data, would not be recognized. Checksum algorithms that give a certain weight to the items being added are more likely to detect changes that may occur, such as transposed, doubled, or omitted numbers. They are used, for example, in ISBNs (International Standard Book Numbers) and EAN codes.

The name "checksum" is also used to describe more complicated test algorithms that perform more complex calculations instead of simply adding data values, such as for a cyclic redundancy check (CRC). A cyclic redundancy check uses polynomial division instead of simple addition and is generally more effective in detecting errors than a basic checksum.

Although a standard checksum is useful in protecting against unintended changes, it offers no security against intentional changes (data manipulation), because it is easy to circumvent. It is therefore often necessary to use cryptographically stronger algorithms, such as one-way hash functions (e.g., message digests) instead of a simple checksum algorithm. These form the basis for electronic signatures.

The cyclic redundancy check (CRC) is a method of determining a test value for data, in order to be able to recognize transmission or storage errors. Using a specific process, a so-called CRC value is calculated for each data block and attached to the data block. To test the data, the same calculation process is applied to the data block, including the assigned CRC value. If the result is zero, it can be assumed that the data block has not been falsified. Different technical applications use variations of this system, such as initiating the calculation with a certain value or inverting the CRC value before transmitting.

CRC is designed such that errors in transmitting data, such as can be caused by noise on the line, are more likely to be detected. CRCs of serial data transmissions can be done very easily in hardware. For example, data transmissions over an Ethernet, as well as most hard-disk transfers, are tested with CRC processes. The CRC process is only suited for detecting accidental errors. It is not appropriate for confirming data integrity. In other words, it is relatively easy, by making intentional modifications, to generate a data stream with the same CRC value as a given message. If such security is required, cryptographic hash functions such as SHA must be applied. The name of the process refers to the fact that the attached value has no information content that is not already included in the data block on which it is based. It is therefore redundant. CRCs are based on cyclic codes. These are block codes, characterized by the fact that each cyclic alteration of the bits in a valid code word is also a valid code word.

Polynomial division, also called partial division, is a mathematical process. It is a similar process to the regular division of numbers with a remainder taught in school, except that here, instead of two digits, two polynomials are divided by each other and the result consists of another two polynomials: the "main portion" and the remainder from the division.

According to another preferred embodiment of the invention, which has features that can also be combined with features of other embodiments, a method is provided in which a virtual identifier is determined from a piece of additional information using a CRC algorithm based on polynomial division.

The invention also includes a method for transmitting messages via a communication network using an address that was generated according to a method as in one of the preceding claims.

The invention also includes a network element equipped to carry out a process as in one of the preceding claims.

The invention is described below in more detail based on preferred exemplary embodiments and with reference to a figure.

The invented method can be demonstrated using an exemplary embodiment in which IP addresses are generated. The IPv6 address auto-configuration is based on the assumption that an IP address contains a globally unique interface identifier, generated from the globally unique MAC address for the LAN card, as an essential component. The starting point for the process is the "ordinary" interface identifier as specified in RFC 2464.

Auto-configuration according to SLAAC preferably takes place basically in three steps:

In the first step, a link-local IP address is self-generated, based on the MAC address of the LAN card. In the second step, there is an automatic search for routers in connected IP networks, the so-called "router discovery," to find routers that can be considered part of the ICMPv6. The routers then provide the host with the IPv6 network addresses (prefixes) and default routers. The host can then belong to multiple IP sub-networks at the same time; the routers send the network address and a piece of information about the default router for each sub-network. In the third step, the host derives the various global IP addresses by combining the IPv6 network addresses with the link-local IP addresses, with one global IP address for each IPv6 network address.

After the end of step 3, the host has, without manual input, a set of global (unique worldwide and routed to the Internet) IP addresses as well as a default router. It is hereinafter assumed that the host belongs to only one IP sub-network, i.e., is receiving only one global IP address. This assumption is made merely to simplify the description. The method itself functions the same way if the host receives IP addresses for multiple sub-networks.

Below is a specific example for constructing a link-local address from a MAC address:

Constructing the Link-Local Address from the MAC Address

RFC 2464

An IPv6 address consists of the interface identifier and the prefix. The following apply to a link-local address:
the interface identifier is generated from the MAC address using the modified EUI-64 format.
the routing prefix is fixed: FE80::/64
  Example
  MAC address:
  Link-local address: fixed
  Routing Prefix
  Interface Identifier
  Universal/Local Bit: 1 (Global Scope)

In this case, according to the invention, if a network interface receives multiple IP addresses, preferably additional "virtual" interface identifiers are generated in addition to this ordinary interface identifier, and also preferably an additional interface identifier for each additional IP address.

To generate a virtual interface identifier, preferably the globally unique MAC address is combined with local information. This local information is preferably used exclusively for generating interface identifiers that can be distinguished within the host. It is generally sufficient for them to be host-internally unique.

A preferred example of such a piece of local information is the pseudo-interface names of IPv4 addresses. If multiple IPv4 addresses are assigned to one network interface, then preferably a unique pseudo-network interface with one preferably host-internally unique pseudo-interface name is assigned to each of these IP addresses. These pseudo-interface names are also suitable for deriving the virtual interface identifiers.

Another preferred example of such a piece of local information is the virtual interface names for IPv6 addresses. For each additional IP address for a network interface, a virtual interface name preferably is first generated or configured. There are basically no restrictions on creating the virtual interface name; however, it is preferably host-internally unique, because it is used as local information when generating the virtual interface identifier. A virtual interface identifier is generated based on the process described in RFC 2464. Preferably the MAC address is entered as globally unique information in the interface identifier as usual. However, the "ordinary" interface identifier is preferably modified in two places:

First, the fixed middle segment (0xFFFE) is replaced, and when a new middle segment is generated, a piece of local information, e.g., the virtual interface name, is processed.

Second, the universal/local bit is inverted, in order to indicate that local information was used when this interface identifier was generated.

To one knowledgeable in the field, it is clear from the preceding description that a new middle segment for the virtual interface identifier can also be generated in other ways, not all of which can be shown here. However, a piece of local information (created specifically for that purpose) is always used to make the resulting virtual interface identifiers host-internally distinguishable from each other. The following examples all use the virtual interface names as local information.

Another preferred example of such a piece of local information is persistent tables. A persistent table is assigned to a network interface, and the virtual interface names are stored in that table. The table index i of a row modifies the old middle segment. One possibility for this is, e.g., the replacement of Value_new=0xFFFE−i.

Another preferred example of a method for constructing a new middle segment for the virtual interface identifier is the so-called checksum method. It uses the virtual interface name as the input datum for a checksum algorithm, preferably with a block size of 16 bits. The checksum replaces the old middle segment 0xFFFE. Preferred checksum algorithms are, for example, parity testing, (ordinary) modulo addition, ones' complement addition, Fletcher checksum, and Adler checksum.

Another preferred example of a method for constructing a new middle segment for the virtual interface identifier is the so-called CRC method. It uses the virtual interface name as the input datum for a CRC algorithm, applying a degree-16 generator polynomial. The 16-bit-wide CRC checksum replaces the old middle segment 0xFFFE. CRC algorithms are based on polynomial division (modulo 2) with binary coefficients; current methods include CRC-16-IBM/ANSI (USB, etc.), CRC-16-CCITT (X.25, HDLC, Bluetooth, SO, etc.), and CRC-16-DECT.

Another advantageous example of a method for constructing a new middle segment for the virtual interface identifier is a "hash process." It uses the virtual interface name as input data for a hash algorithm. The 16-bit-wide hash value replaces the old middle segment 0xFFFE. There are basically no restrictions on the choice of a hash algorithm. Cryptographic hash algorithms do generate very high computer use compared to non-cryptographic hash algorithms. A hash algorithm initially provides a wider hash value, which must then be reduced to a 16-bit width, using XOR Folding, for example. Virtual interface identifiers generated in this way are highly likely to be globally unique, because the MAC address is input unchanged. However, because the universal/local bit is set to "local scope," it is not impossible for the same interface identifier to be generated elsewhere by the random generator. The risk of such a random collision is $(\frac{1}{2})^{63}$, which is smaller than $(10)^{-18}$ and therefore extremely low.

The known auto-configuration method (SLAAC), which includes three steps, is preferably expanded or modified according to the invention as follows:

i) When the link-local IPv6 addresses are generated, other link-local IPv6 addresses are generated in addition to the usual one link-local IPv6 address. The starting point of this is to have local information available that is preferably configured manually in advance, preferably in the form of a list for each additional required link-local IPv6 address. First, all required virtual interface identifiers are generated from the list of pieces of local information together with the (global) MAC address. For each new virtual interface identifier, the method also tests to see whether it already exists (collision testing). If a collision is detected, the auto-configuration of that virtual interface identifier is aborted. Next, for each virtual interface identifier, a link-local IPv6 address is generated by affixing the link-local prefix (OxFE80::/64) to the beginning of it. All of the link-local IPv6 addresses generated in this way are then placed on the network interface.

ii) Router discovery can remain unchanged. A global prefix (IPv6 network address) and a default router are generated in the router advertisement messages using known existing processes.

iii) Global IPv6 addresses are now generated from link-local IPv6 addresses, whereby the link-local prefix (OxFE80::/64) is replaced by a global prefix (which may be considered known following successful router discovery). In this way, for each of the link-local IPv6 addresses, a corresponding globally unique IPv6 address is created and placed on the network interface.

IPv6 address assignment can be fully automated; manual IPv6 address configuration is not necessary. If only one LAN card is being used, then only one MAC address is needed also. This is true even if multiple IP addresses are auto-configured.

Below is a specific example for constructing multiple link-local IP addresses from the same MAC address, according to a preferred exemplary embodiment of the invention:

---

Constructing multiple link-local IP addresses from the same MAC address (NEW)

Example: List of pseudo-interface names
| | |
|---|---|
| eth0 | FE80::02: 1A:E8:FF:FE:84:30:12 |
| eth0:ncui_sig | FE80::00:1A:E8:AF:4F:84:30:12 |
| eth0:ncui_pld | FE80::00:1A:E8:A9:52:84:30:12 |
| eth0:pbc_2 | FE80::00: 1A:E8:97:A9:84: 30:12 |
| eth0:pbc_3 | FE80::00: 1A:E8:97:AA:84:30:12 |
| eth0:pbc_4 | FE80::00: 1A:E8:97:AB:84:30:12 |

Algorithm:
runs the 16-bit checksum through the interface names
replaces OxFFFE through the checksum
sets the universal/local bit: 0 (Local Scope)
If an address collision is detected: aborts auto-configuration

---

FIG. 1 shows a schematic flow diagram of the method according to the invention using a preferred exemplary embodiment. From an existing identifier (a) and a configured piece of additional information (b), a virtual identifier (c) is generated (1). From at least one virtual identifier (c), an address (e, d) is generated. The generated addresses or identifiers are tested for the presence of any collision (3). If this test (3a) detects a collision (f), the colliding virtual identifiers or the addresses generated from those virtual identifiers are deleted (4). Reference g indicates the collision-free addresses after collision testing.

Addresses can also be generated from the identifiers later in the process. In that case, the process steps prior to generation of the addresses are performed on the virtual identifiers from which those addresses are later generated.

I claim:

1. A method for creating multiple addresses for a network element in a communication network, the communication network comprising a plurality of electronic devices communicatively connected to each other, the addresses associated with the network element in the communication network such that data packets are routable to the network element via the communication network, the method comprising:
   a) creating virtual identifiers for each of the addresses to be created from an existing identifier for the network element and at least one configured piece of additional information stored on the network element, the network element being a computer device comprising a processor connected to a non-transitory computer readable medium, the network element having an interface that connects the network element to the communication network, each of the addresses to be defined such that data is transmittable to the network element via the communication network by inclusion of the address within a data packet to be transmitted via the communication network, each of the virtual identifiers created by a virtual identifier creation process comprising:
   forming an initial identifier based on the existing identifier and subsequently replacing a middle segment of the initial identifier with a value derived from the formed initial identifier to form the virtual identifier;
   b) creating the addresses based on the created virtual identifiers;
   c) testing at least one of the created virtual identifiers and the created addresses for collisions; and
   d) discarding at least one of any of the created virtual identifiers determined from the testing to be a colliding virtual identifier and the created addresses created from those colliding virtual identifiers; and
   e) retaining at least one address that is determined from the testing not to be a colliding address or that is created from a virtual identifier that is determined from the testing to not be a colliding virtual identifier so that the network element is addressable for data transmission via the communication network by inclusion of the retained at least one address within a data packet to address the data packet for delivery to the network element via the communication network.

2. The method of claim 1, comprising generating a link-local address from a virtual identifier and affixing a link-local prefix to the beginning of that virtual identifier.

3. The method of claim 2, comprising generating a global address from a link-local address and replacing the link-local prefix with a global prefix.

4. The method of claim 1, wherein
   the communication network is a network in which messages are transmitted in data packet form between network elements;

the created addresses are IPv6 addresses; and the existing identifier of the network element is Media Access Control (MAC) address of the interface of the network element.

5. The method of claim 4, wherein the initial identifier is formed from the MAC address and the value that replaces the middle segment is a hash value derived from the initial identifier by the initial identifier being used as an input in a hash function used to generate the value.

6. The method of claim 1, wherein at least one virtual identifier includes an indication based on which it can be distinguished from a regular identifier for a network element.

7. The method of claim 1, wherein some or all of the addresses from some or all of the generated virtual identifiers are not generated until after at least one additional step occurs.

8. The method of claim 1, wherein the piece of additional information exists in a form of a table whose inputs are stored as different values for names of virtual identifiers, and wherein each name is a function of an index of the table.

9. The method of claim 1, wherein the piece of additional information is an input datum for a checksum algorithm used to generate the value for use in creating the virtual identifier.

10. The method of claim 1, wherein the value is derived from using a CRC algorithm based on polynomial division.

11. A method for transmitting messages via a communication network, comprising, creating addresses according to the method of claim 1; and at least one of:

receiving, by the network element, at least one message addressed to one of the created addresses via the communication network and the interface of the network element, and sending a message to the network element via at least one of the created addresses in a transmission of the message sent via the communication network.

12. A network element that is configured to execute the method of claim 1, the network element being a device having an electronic system that is configured to communicate via the communication network to other devices of the communication network, the electronic system including the interface.

13. The network element of claim 12, wherein the network element is a router, a switch, or a communication terminal.

14. The network element of claim 12, wherein the network element is a communication device.

15. The method of claim 1, wherein at least one of the created virtual identifiers is created such that the virtual identifier has an inverted universal bit of the initial identifier or an inverted local bit of the initial identifier to indicate that the piece of additional information was used to form that virtual identifier.

16. The method of claim 1, wherein the virtual identifier creation process also comprises inverting a universal bit of the initial identifier or inverting a local bit of the initial identifier to form the virtual identifier.

17. The method of claim 1, wherein the value derived from the formed initial identifier is generated from using the initial identifier as an input to a cyclic redundancy check (CRC) algorithm to generate the value.

18. The method of claim 1, wherein the value derived from the formed initial identifier is generated from using the initial identifier as an input to a checksum algorithm to determine the value.

19. The method of claim 1, wherein the value derived from the formed initial identifier is generated from using the initial identifier as an input to a hash algorithm to determine the value, the value being a hash value.

20. The method of claim 1, wherein the interface of the network element is a network interface and the existing identifier of the network element is a Media Access Control (MAC) address of the network interface of the network element;

wherein the value derived from the formed initial identifier is generated from using the initial identifier as an input to one of:
(i) a hash algorithm,
(ii) a checksum algorithm, and
(iii) a cyclic redundancy check (CRC) algorithm; and
wherein the virtual identifier creation process also comprises inverting a universal bit of the initial identifier or inverting a local bit of the initial identifier to form the virtual identifier, the inverted local bit or the inverted universal bit indicating that the piece of additional information was used to form the virtual identifier.

* * * * *